(12) United States Patent
Kurabayashi (10) Patent No.: US 12,121,797 B2
(45) Date of Patent: Oct. 22, 2024

(54) PROGRAM, ELECTRONIC DEVICE, AND METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 496 days.

(21) Appl. No.: 17/212,290

(22) Filed: Mar. 25, 2021

(65) Prior Publication Data

US 2021/0205698 A1 Jul. 8, 2021

Related U.S. Application Data

(63) Continuation of application No. PCT/JP2019/037523, filed on Sep. 25, 2019.

(30) Foreign Application Priority Data

Sep. 26, 2018 (JP) .................................. 2018-180372

(51) Int. Cl.
*A63F 13/2145* (2014.01)
*A63F 13/55* (2014.01)
(Continued)

(52) U.S. Cl.
CPC .......... *A63F 13/2145* (2014.09); *A63F 13/55* (2014.09); *G06F 3/0484* (2013.01);
(Continued)

(58) Field of Classification Search
CPC ................. A63F 13/2145; A63F 13/55; A63F 2300/1075; A63F 2300/6045; G06F 3/0484; G06F 3/0488
See application file for complete search history.

(56) References Cited

U.S. PATENT DOCUMENTS

2006/0052166 A1 3/2006 Ohta
2013/0002600 A1* 1/2013 McCracken ........ G06F 3/04186
345/173

(Continued)

FOREIGN PATENT DOCUMENTS

JP 2001022488 A 1/2001
JP 3734820 B1 1/2006
(Continued)

OTHER PUBLICATIONS

International Search Report issued in Application No. PCT/JP2019/037523, mailed on Oct. 29, 2019 (5 pages).
(Continued)

*Primary Examiner* — Werner G Garner (57) ABSTRACT

One or more embodiments of the invention is a program that is executed on an electronic device equipped with a touchscreen, the program causing the electronic device to execute: holding data points as a data point sequence per predefined processing period, the data points being obtained based on touch events generated as a result of an operation performed on the touchscreen by a user; and determining displacement rates of data points in held data point sequences based on displacements of the data points in the data point sequences, and determining a speed factor with which the user controls movement of an operable object in a virtual space based on a deviation of the displacement rate in the latest data point sequence among the held data point sequences relative to the average of the displacement rates in the data point sequences held earlier than the latest data point sequence.

8 Claims, 5 Drawing Sheets

(51) Int. Cl.
    *G06F 3/0484*     (2022.01)
    *G06F 3/0488*     (2022.01)
(52) U.S. Cl.
    CPC .... *G06F 3/0488* (2013.01); *A63F 2300/1075* (2013.01); *A63F 2300/6045* (2013.01)

(56) References Cited

U.S. PATENT DOCUMENTS

| | | | |
|---|---|---|---|
| 2013/0267316 A1 | 10/2013 | Ohta | |
| 2014/0071075 A1 | 3/2014 | Yamamoto | |
| 2017/0319960 A1 | 11/2017 | Ohta | |
| 2017/0352179 A1* | 12/2017 | Hardee | ............... A63F 13/65 |
| 2018/0146018 A1* | 5/2018 | Chang | ............. H04N 21/41407 |

FOREIGN PATENT DOCUMENTS

| | | |
|---|---|---|
| JP | 2014056487 A | 3/2014 |
| WO | 2018084169 A1 | 5/2018 |

OTHER PUBLICATIONS

Written Opinion issued in International Application No. PCT/JP2019/037523, mailed on Oct. 29, 2019 (5 pages).
Baldauf, M. et al.; "Investigating On-Screen Gamepad Designs for Smartphone-Controlled Video Games;" ACM Trans. Multimedia Comput. Commun.; Appl. 12; Article 22; Oct. 2015 (19 pages).
Notice of Reasons for Refusal issued in Japanese Application No. 2019-133775 mailed on Aug. 1, 2022 (6 pages).

* cited by examiner

PROGRAM, ELECTRONIC DEVICE, AND METHOD

TECHNICAL FIELD

The present invention relates to programs, electronic devices, and methods. In particular, the present invention relates to a program that is executed by an electronic device equipped with a touchscreen, to an electronic device, and to a method.

BACKGROUND ART

With recent improvements in touchscreen technology, electronic devices of the type in which user inputs are performed via a user interface on a touchscreen have become widely used. Furthermore, with games that are executed on an electronic device, instead of user inputs via a conventional physical controller, the form in which user inputs are performed via a touchscreen provided on an electronic device is becoming widely used.

In particular, compact portable electronic devices, such as smartphones, have rapidly become popular, and a large number of games that are executed on such portable electronic devices have been released. In this situation, various technologies have been proposed concerning methods of operating a virtual object displayed on the touchscreen, such as a player character, including, for example, the technology relating to virtual pads, disclosed in Non-Patent Literature 1.

For example, Patent Literature 1 discloses a game device equipped with a touchscreen, as well as a program, that make it possible to set an origin in accordance with a touch operation by a user and that enables an operation simulating a joystick. The game device sets reference coordinates on the basis of coordinates at the time when detection is started in the case where a touchscreen makes a transition from a state in which a touch has not been detected to a state in which a touch has been detected, and in the case where touch detection is to be continued, sets instruction coordinates on the basis of coordinates detected after the transition. Then, the game device recognizes the direction of a vector from the reference coordinates to the instruction coordinates as the direction in which a joystick is tilted and the magnitude of the vector as the degree by which the joystick is tilted, thereby realizing a virtual joystick, whereby the operation of a virtual object is realized.

CITATION LIST

Patent Literature

PTL 1

Publication of Japanese Patent No. 3734820

SUMMARY OF INVENTION

Technical Problem

In the existing technology disclosed in Patent Literature 1, a user places a finger at one point on the touchscreen to cause the game device to recognize the reference coordinates, slides the finger while maintaining contact, and causes the game device to recognize the instruction coordinates with the contact position of the finger after the slide. With the thus-configured existing technology, when the user inputs a direction, it has been necessary to generate a significant distance from the reference coordinates to the instruction coordinates, which makes it difficult to realize high responsiveness. For example, in the case where the user wishes to perform an operation of considerably tilting the virtual joystick, it has been necessary to generate the magnitude of the vector from the reference coordinates to the instruction coordinates correspondingly to the degree of tilting of the considerably tilted joystick.

Thus, as an operation method for controlling a virtual object disposed in a virtual space, which is displayed on a touchscreen, for example, there is a demand for realizing a quicker and more intuitive operation method. To put it in a more generalized manner, as an operation method for controlling an operable object, which is disposed in a virtual space and which may be operated by a user, there is a demand for realizing an operation method with improved operability.

The present invention has been made in order to solve the problem described above, and a main object thereof is to provide a program, etc. that makes it possible to improve operability in controlling an operable object in a virtual space.

Solution to Problem

In order to achieve the above object, a program according to an aspect of the present invention is a program that is executed on an electronic device equipped with a touchscreen, the program being characterized by causing the electronic device to execute: a step of holding one or more data points as a data point sequence per predefined processing period, the data points being obtained on the basis of touch events generated as a result of an operation performed on the touchscreen by a user and indicated by values on a first axis and values on a second axis; and a step of determining displacement rates of data points in held data point sequences on the basis of displacements of the data points in the data point sequences, and determining a speed factor with which the user controls movement of an operable object in a virtual space on the basis of a deviation of the displacement rate in the latest data point sequence among the held data point sequences relative to the average of the displacement rates in the data point sequences held earlier than the latest data point sequence.

Furthermore, in the present invention, preferably, in the step of holding one or more data points as a data point sequence, the holding of the data point sequence for which a predefined holding period has expired among the held data point sequences is terminated.

Furthermore, in the present invention, preferably, in the step of determining a speed factor, the speed factor is determined on the basis of a deviation of the displacement rate in one data point sequence among the held data point sequences relative to the average of the displacement rates in the data point sequences held earlier than the one data point sequence.

Furthermore, in the present invention, preferably, in the step of holding one or more data points as a data point sequence, the values on the first axis and the values on the second axis of the one or more data points are held individually as a sequence for the first axis and a sequence for the second axis, and in the step of determining a speed factor, the displacement rate in the held data point sequence is determined on the basis of a displacement of the values of the sequence for the first axis and a displacement of the values of the sequence for the second axis in the data point sequence.

Furthermore, in the present invention, preferably, in the step of determining a speed factor, the displacement rate in the held data point sequence is determined on the basis of the amount of displacement of data points adjacent to each other sequentially in time in the data point sequence as well as the number of data points included in the data point sequence.

Furthermore, in the present invention, preferably, the first axis and the second axis are parallel to the longer sides and the shorter sides of the touchscreen.

Furthermore, in the present invention, preferably, the predefined processing period is a period corresponding to a frame rate for executing a game, and the program further causes the electronic device to execute a step of determining, on the basis of the speed factor, a movement state of the operable object displayed on the touchscreen.

Furthermore, in the present invention, preferably, the operable object is an operable character, and the movement state includes a state in which the operable character is walking and a state in which the operable character is running.

Furthermore, in order to achieve the above object, an electronic device according to an aspect of the present invention is an electronic device equipped with a touchscreen, the electronic device being characterized in that: one or more data points are held as a data point sequence per predefined processing period, the data points being obtained on the basis of touch events generated as a result of an operation performed on the touchscreen by a user and indicated by values on a first axis and values on a second axis, displacement rates of data points in held data point sequences are determined on the basis of displacements of the data points in the data point sequences, and a speed factor with which the user controls movement of an operable object in a virtual space is determined on the basis of a deviation of the displacement rate in the latest data point sequence among the held data point sequences relative to the average of the displacement rates in the data point sequences held earlier than the latest data point sequence.

Furthermore, in order to achieve the above object, a method according to an aspect of the present invention is a method that is executed on an electronic device equipped with a touchscreen, the method being characterized by including: a step of holding one or more data points as a data point sequence per predefined processing period, the data points being obtained on the basis of touch events generated as a result of an operation performed on the touchscreen by a user and indicated by values on a first axis and values on a second axis; and a step of determining displacement rates of data points in held data point sequences on the basis of displacements of the data points in the data point sequences, and determining a speed factor with which the user controls movement of an operable object in a virtual space on the basis of a deviation of the displacement rate in the latest data point sequence among the held data point sequences relative to the average of the displacement rates in the data point sequences held earlier than the latest data point sequence.

Advantageous Effects of Invention

The present invention makes it possible to improve operability in controlling an operable object in a virtual space.

DESCRIPTION OF EMBODIMENTS

An embodiment of the present invention will be described below with reference to the drawings. The same reference signs signify the same or corresponding parts throughout the drawings unless otherwise specifically mentioned, and there are cases where the vertical to horizontal scale is shown to be different from the real scale for convenience of description. Furthermore, there are cases where descriptions that are more detailed than necessary are omitted for convenience of description. For example, there are cases where detailed descriptions of matters that are already well known and repeated descriptions of substantially the same configurations are omitted.

An electronic device 10 according to an embodiment of the present invention has installed therein a game application that presents a user with a virtual object disposed in a virtual space while causing the game to proceed. When the game application is executed, the electronic device 10 according to this embodiment provides a virtual controller (virtual controller) for controlling an operable object, which is a virtual operable object by the user in the virtual space, in response to an operation by the user. The virtual space is defined by the game application, and may be either a two-dimensional space or a three-dimensional space. For example, the virtual object is a character or an item disposed in the virtual space. In this embodiment, the operable object is a character disposed in the virtual space (operable character). Alternatively, the operable object may be an item disposed in the virtual space, a virtual camera, or the like.

For convenience of description, in this embodiment, it is assumed that the electronic device 10 has the above-described game application installed therein; however, there is no limitation to the above-described game application. It suffices for the electronic device 10 to have installed therein a game application that can control an operable object in response to an operation by a user. For example, instead of or in addition to the game application, the electronic device 10 may have installed therein an input support application or a simulation application that brings about an action of an operable object in response to an operation by a user. In the following description, the term "application" refers to application programs in general, and may refer to apps that are installed on a smartphone or a tablet.

Figure 1:
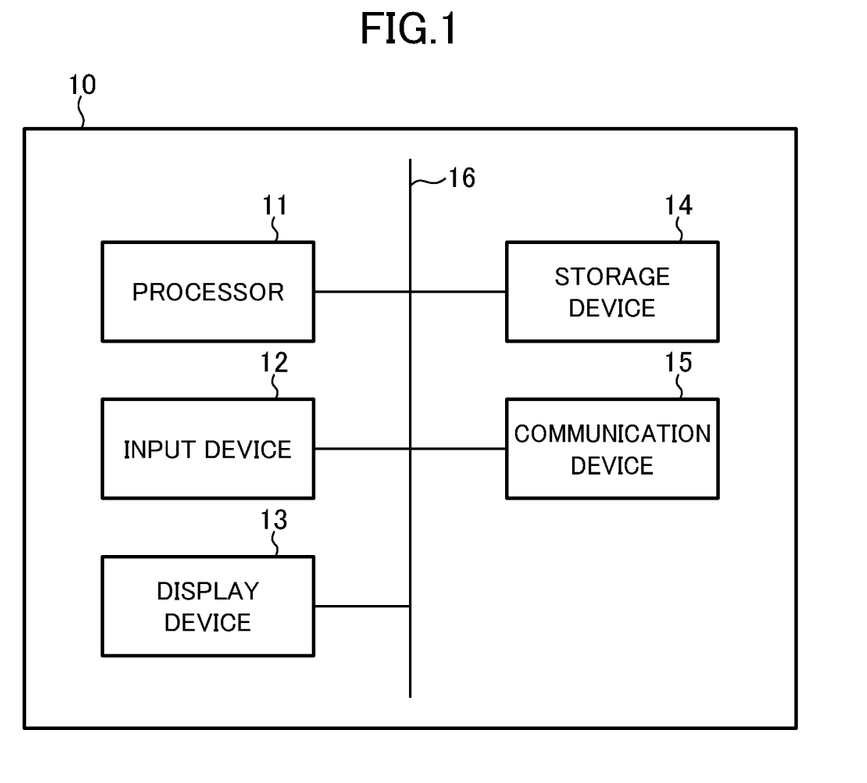
FIG. 1 is a block diagram showing the hardware configuration of an electronic device according to an embodiment of the present invention.

FIG. 1 is a block diagram showing the hardware configuration of the electronic device 10 according to the embodiment of the present invention. The electronic device 10 includes a processor 11, an input device 12, a display device 13, a storage device 14, and a communication device 15. These constituent devices are connected via a bus 16. It is assumed that interfaces are interposed as needed between the bus 16 and the individual constituent devices. In this embodiment, the electronic device 10 is a smartphone. Alternatively, the electronic device 10 may be a terminal such as a computer equipped with a contact-type input device, like a tablet computer or a touchpad, as long as the terminal includes the configuration described above.

The processor 11 controls the overall operation of the electronic device 10. For example, the processor 11 is a CPU. Alternatively, an electronic circuit such as an MPU may be used as the processor 11. The processor 11 executes various kinds of processing by loading programs and data stored in the storage device 14 and executing the programs. In one example, the processor 11 is constituted of a plurality of processors.

The input device 12 is a user interface for accepting inputs to the electronic device 10 from the user; for example, the input device 12 is a touchscreen, a touchpad, a keyboard, or a mouse. The display device (display) 13 displays application screens, etc. to the user of the electronic device 10 under the control of the processor 11. In this embodiment, since the electronic device 10 is a smartphone, the electronic device 10 includes a touchscreen 17 as the input device 12, and the touchscreen 17 also functions as the display device 13; that is, the input device 12 and the display device 13 have an integrated structure. Although the touchscreen 17 in this embodiment is a projection-type electrostatic capacitive touchscreen, a device having an equivalent function, if any, may be adopted.

The storage device 14 is a storage device included in an ordinary smartphone, including a RAM, which is a volatile memory, and a ROM, which is a non-volatile memory. The storage device 14 may also include an external memory. The storage device 14 stores various kinds of programs, including a game application. For example, the storage device 14 stores an operating system (OS), middleware, application programs, various kinds of data that may be referred to when these programs are executed, etc.

In one example, the storage device 14 includes a main storage device and an auxiliary storage device. The main storage device is a volatile storage medium that allows high-speed reading and writing of information, and is used as a storage area and a work area when the processor 11 processes information. The auxiliary storage device stores various programs and data that are used by the processor 11 when the individual programs are executed. The auxiliary storage device is, for example, a hard disk device; however, the auxiliary storage device may be any type of non-volatile storage or non-volatile memory, which may be of the removable type, that is capable of storing information.

The communication device 15 sends data to and receives data from other computers, such as a server, via a network. For example, the communication device 15 performs wireless communication, such as mobile communication or wireless LAN communication, to connect to the network. In one example, the electronic device 10 downloads a program from a server by means of the communication device 15 and stores the program in the storage device 14. Alternatively, the communication device 15 may perform known wired communication. In the case where data is neither sent to nor received from other computers, the electronic device 10 need not include the communication device 15.

Figure 2:
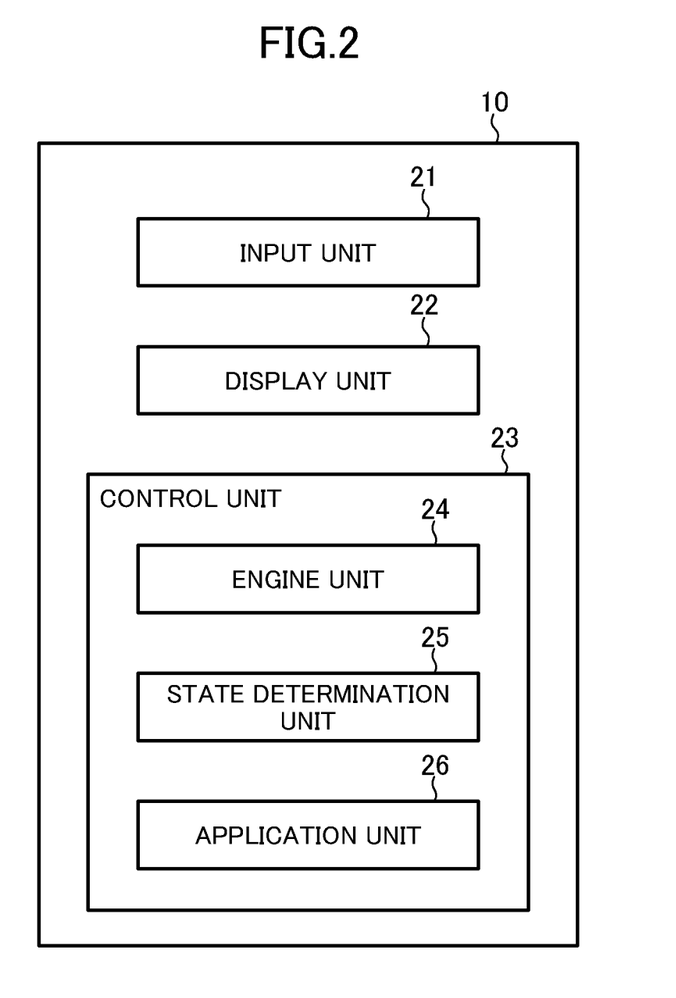
FIG. 2 is a functional block diagram of the electronic device according to the embodiment of the present invention.

FIG. 2 is a functional block diagram of the electronic device 10 according to the embodiment of the present invention. The electronic device 10 includes an input unit 21, a display unit 22, and a control unit 23. The control unit 23 includes an engine unit 24, a state determination unit 25, and an application unit 26. In this embodiment, these functions are realized by the processor 11 executing a program. For example, the program that is executed is a program stored in the storage device 14 or received via the communication device 15. Since various kinds of functions are realized by loading a program, as described above, a portion or the entirety of one part (function) may be provided in another part. Alternatively, these functions may be realized by means of hardware by configuring electronic circuits or the like for realizing the individual functions in part or in entirety.

The input unit 21 is configured by using the input device 12, and accepts inputs to the electronic device 10 from the user. In this embodiment, the input unit 21 accepts a touch operation performed on the touchscreen 17 by the user and generates touch events, for which a touch detection function generally provided in a smartphone having the touchscreen 17 can be used.

The display unit 22 displays a game application screen on the display device 13 so as to display a screen in accordance with user operations.

The control unit 23 realizes a virtual controller. In this embodiment, an architecture having a three-layer structure is adopted for the control unit 23, and the engine unit 24, the state determination unit 25, and the application unit 26 correspond to the individual layers. For example, the control unit 23 is realized by the processor 11 executing a program suite constituted of programs corresponding to the individual layers.

The engine unit 24 determines a speed factor and an angle with which the user controls the movement of an operable object in the virtual space by mainly using touch events generated by touch operations performed on the touchscreen 17 by the user, and forwards the speed factor and the angle to the state determination unit 25. The speed factor is a value for determining the speed of the operable object. In this embodiment, since the operable object is an operable character, the speed factor is a value for also determining a motion of the character, such as walking or running. The angle is a value for determining the direction of movement of the operable object. As the angle determination method for the engine unit 24, for example, a method disclosed in Japanese Patent Application No. 2018-094656 is used, and thus the method will not be described in this description.

The state determination unit 25 determines the movement state of the operable object by using the speed factor forwarded from the engine unit 24, and forwards the speed factor and the movement state to the application unit 26.

The application unit 26 corresponds to a specific game application that implements actions, etc. in a game. In this game application, similarly to game applications in general, a frame rate is defined, and for example, the main loop of a main program is executed per period corresponding to the frame rate. Generally, the frame rate is 30 fps (frames per second) or 60 fps. Alternatively, the application unit 26 may be configured to correspond to an input support application or a simulation application that brings about an action of the operable object in response to a user operation.

The engine unit 24 holds, in a first buffer in the storage device 14, data points obtained on the basis of touch events generated by user operations on the touchscreen 17 and indicated by values on the first axis and values on the second axis. Here, a touch event occurs when the user places a finger in contact with the touchscreen 17 (touchstart), when the user moves the finger while keeping the finger in contact with the touchscreen 17 (touchmove), when the user removes the finger from the touchscreen 17 (touchend), etc.

The engine unit 24 obtains a touch event when a touch event occurs. When obtaining a touch event, the engine unit 24 obtains a set of numerical values (x, y) consisting of two variables and corresponding to a position at which the electrostatic capacitance on the touchscreen 17 has changed, and stores the set of numerical values (x, y) in the first buffer. The data of the set of numerical values consisting of two variables is obtained by the engine unit 24 in association with a touch event, and corresponds to a data point indicated by a value on the first axis and a value on the second axis.

Figure 3:
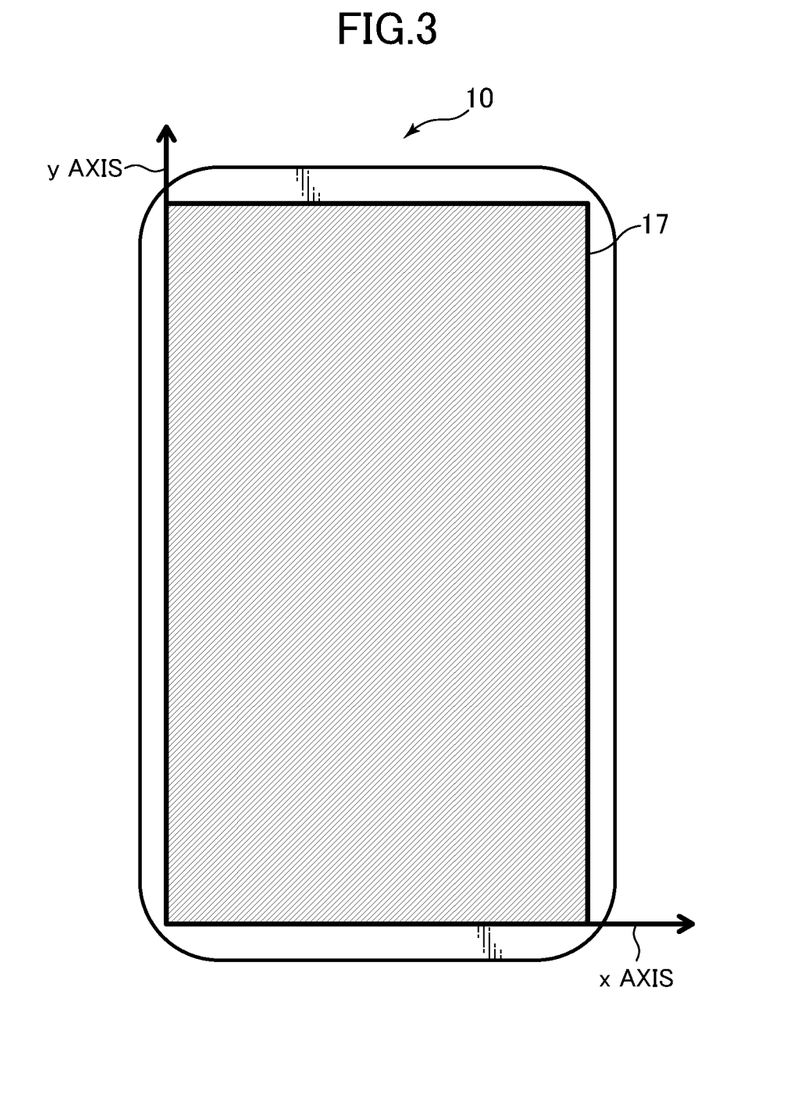
FIG. 3 is an illustration showing coordinate axes consisting of a first axis and a second axis in the embodiment.

In this embodiment, for convenience of description, the first axis and the second axis are defined as follows. FIG. 3 is an illustration showing coordinate axes consisting of the first axis and the second axis in this embodiment. The first axis is a horizontal axis (x axis) substantially parallel to the shorter sides of the touchscreen 17. The second axis is a vertical axis (y axis) substantially parallel to the longer sides of the touchscreen 17. A position on the touchscreen 17 is expressed in the form of coordinates (x, y) along the first axis (x axis) and the y second axis (y axis). Thus, in this embodiment, the coordinates (x, y) of a data point correspond to a position on the touchscreen 17, and the engine unit 24 holds the coordinates (x, y) as a data point in the first buffer. The coordinate setting shown in FIG. 3 is just an example, and coordinates may be set differently from the above example depending on the program installed in the electronic device 10.

The engine unit 24 stores one or more data points held in the first buffer as a data point sequence per predefined processing period. In this embodiment, the engine unit 24 holds the data point sequence in a second buffer in the storage device 14 per frame period (frame interval). The frame period F (seconds) is a period corresponding to a frame rate for executing the game; for example, F is 1/30 seconds in the case where the frame rate is 30 fps.

The data point sequence P(i) held by the engine unit 24 in the i-th frame is expressed by using the individual data points as follows:

$$P(i) = \{P_{i,1}, P_{i,2}, \ldots, P_{i,m}\}$$

The individual data points included in P(i) are the data points held in the first buffer during the i-th frame period. The value of the x coordinate and the value of the y coordinate of each of the data points $P_{i,k}$ (k=1 to m) are expressed by ($x_{i,k}$, $y_{i,k}$). It is assumed that the order of the timings of storage of the individual data points in the first buffer is $P_{i,1}$, $P_{i,2}$, ..., $P_{i,m}$ from the earliest to the latest. The engine unit 24 holds P(i) after an elapse of one frame period F (seconds) after holding the (i−1)-th P(i−1), and holds P(i+1) after an elapse of another frame period. The value of the variable m, which signifies the number of data points included in P(i), varies depending on P(i).

The engine unit 24 terminates the holding of a data point sequence for which a predefined holding period has expired among the data point sequences held in the second buffer. For example, when terminating the holding of the data of a data point sequence, the engine unit 24 may delete the data, invalidate the data, or delete the data, as appropriate, by associating a flag indicating that the holding has been terminated with the data. For example, the engine unit 24 defines a variable D specifying the life of the data points stored in the second buffer. The period specified by the variable D corresponds to the predefined processing period, and corresponds to the frame period in this embodiment. For example, the engine unit 24 holds a data point sequence P(i) in the second buffer in association with a time $t_i$ at which the data point sequence P(i) was held. After storing one data point sequence P(i) in the second buffer, the engine unit 24 monitors the time elapsed T since the storage of the data point sequence P(i) and continuously compares the time elapsed T with the variable D. When the monitored time elapsed T for the data point sequence P(i) exceeds the variable D, the engine unit 24 terminates the holding of the data point sequence P(i) in the second buffer. The engine unit 24 can calculate the time elapsed T by using the timing $t_i$ of holding.

In this embodiment, the engine unit 24 holds one data point sequence P(i) in the second buffer for a period 5F (seconds) corresponding to five frames. Thus, the engine unit 24 holds five data point sequences. The engine unit 24 holds the five data point sequences such that the order of the data point sequences is P(5), P(4), P(3), P(2), and P(1) from the latest to the earliest. Accordingly, in the case where the engine unit 24 holds data point sequences corresponding to five frames, the latest held data point sequence is P(5). In the case where a data point sequence is to be newly held, the engine unit 24 holds the new data point sequence as P(5), and substitutes the data of P(i+1) for P(i) (1≤i≤4). At this time, the engine unit 24 terminates the holding of P(1), for which the predefined holding period has expired.

In one preferred example, the engine unit 24 holds the x coordinate value and the y coordinate value separately as data point sequences per frame period. A set X of x coordinate values and a set Y of y coordinate values held by the engine unit 24 are expressed by equations (1) and (2), respectively.

$$X = \begin{bmatrix} x_{1,1} & \cdots & x_{n,1} \\ \vdots & \ddots & \vdots \\ x_{1,m} & \cdots & x_{n,m} \end{bmatrix} \quad (1)$$

$$Y = \begin{bmatrix} y_{1,1} & \cdots & y_{n,1} \\ \vdots & \ddots & \vdots \\ y_{1,m} & \cdots & y_{n,m} \end{bmatrix} \quad (2)$$

Here, n signifies the number of data point sequences held in the second buffer by the engine unit 24, which corresponds to the number of frames. In this embodiment, since the engine unit 24 holds data point sequences for a period 5F (seconds) corresponding to five frames, n=1, n=2, n=3, n=4, n=5, n=5, . . . , n=5 as time elapses. Accordingly, n=5 after an elapse of the period 5F (seconds) corresponding to five frames. Furthermore, the x coordinate values of the latest held data point sequence P(n) are $x_{n,0}$, . . . $x_{n,m}$, and the y coordinate values of the latest held data point sequence P(n) are $y_{n,0}$, . . . $y_{n,m}$. Note that the maximum value of n varies depending on the period for which the engine unit 24 holds a data point sequence.

The engine unit 24 determines a speed factor on the basis of the deviation of a displacement rate $v_n$ in the latest data point sequence among the held data point sequences relative to the average of displacement rates $v_1$ to $v_{n-1}$ in the data point sequences held earlier than the latest data point sequence. Preferably, the engine unit 24 determines a speed factor on the basis of the deviation of a displacement rate $v_i$ (i=1 to n) in one data point sequence among the held data point sequences relative to the average of displacement rates $v_1$ to $v_{i-1}$ in the data point sequences held earlier than the one data point sequence. Here, the deviation of the displacement rate $v_i$ relative to the average of the displacement rates $v_0$ to $v_{i-1}$ is, for example, the deviation of the displacement rate $v_i$ from the average of the displacement rates $v_0$ to $v_{i-1}$. Note that the average of the displacement rates $v_i$ to $v_{i-1}$ is 0 in the case where i=1 and $v_1$ in the case where i=2.

The engine unit 24 outputs the determined speed factor to the state determination unit 25. Instead of outputting the determined speed factor directly to the state determination unit 25, the engine unit 24 may store the determined speed factor in a memory area of the storage device 14 that is referred to by the state determination unit 25.

Specifically, the engine unit 24 calculates the speed factor in the following manner. The speed factor is a value that is output from a cumulative pointwise deviation function (CPD function) defined as follows. The CPD function is calculated according to equation (3). The engine unit 24 outputs the value output from the CPD function to the state determination unit 25.

$$CPD(x, y) = \sqrt{\frac{1}{n}\sum_{i=1}^{n}(v_i - avg_{i-1}(V))^2} \quad (3)$$

Here, n signifies the number of data point sequences held in the second buffer by the engine unit 24.

$v_i$ signifies the displacement rate in the i-th data point sequence or the displacement rate in the i-th frame. The displacement rate corresponds to the movement speed of a finger of the user as calculated from the set of touched points (the set of data points) in the relevant frame period. In one example, the engine unit 24 determines the displacement rate of data points in a data point sequence held in the second buffer on the basis of the displacement of the data points in that data point sequence. In one example, in the case where the engine unit 24 holds x coordinate values and y coordinate values separately as data point sequences, the engine unit 24 determines a displacement rate on the basis of the displacement of the x coordinate values and the displacement of the y coordinate values in a data point sequence held in the second buffer. In one example, the engine unit 24 determines a displacement rate on the basis of the amount of displacement of data points adjacent to each other sequentially in time in a data point sequence held in the second buffer and the number of data points included in that data point sequence.

Specifically, a displacement rate is calculated according to equation (4).

$$v_i = \frac{\alpha}{m-1}\sum_{j=1}^{m-1}\left(\beta\sqrt{(x_{i,j} - x_{i,j+1})^2 + (y_{i,j} - y_{i,j+1})^2}\right) \quad (4)$$

Here, $\alpha$ signifies a real value greater than or equal to 0, which is usually 1, and serving as a coefficient corresponding to the pixel density of the display in dots per inch (DPI). $\beta$ signifies an integration weight that increases the likelihood of an abrupt change being reflected in the displacement rate as the value thereof becomes greater and that decreases the likelihood of an abrupt change being reflected in the displacement rate as the value thereof becomes smaller. In the case where P(i) includes no data points, the engine unit 24 does not calculate the displacement rate $v_i$, and sets, for example, $v_i=0$. Also in the case where P(i) includes only one data point, similarly, the engine unit 24 does not calculate the displacement rate $v_i$, and sets, for example, $v_i=0$.

$avg_{i-1}(v)$ signifies the average of the displacement rates $v_i$ up to immediately before the i-th frame. $avg_{i-1}(v)$ is calculated according to equation (5).

$$avg_{i-1}(V) = \begin{cases} \frac{1}{i-1}\sum_{j=1}^{i-1}v_j, & i-1>0 \\ 0, & i-1=0 \end{cases} \quad (5)$$

Here, in the case where i=1, since there is no displacement rate up to immediately before, $avg_{i-1}(v)=0$.

The state determination unit 25 determines the movement state of an operable object displayed on the touchscreen 17, on the basis of the speed factor determined by the engine unit 24. In this embodiment, the operable object is an operable character, and the movement state determined by the state determination unit 25 is either a state in which the operable character is walking or a state in which the operable character is running.

In one example, the state determination unit 25 outputs a value output from a classify function defined as follows. The classify function is calculated according to equation (6).

$$\text{classify}(x, y) = \begin{cases} \text{"walk"}, & CPD(x, y) \le \tau \\ \text{"run"}, & CPD(x, y) > \tau \end{cases} \quad (6)$$

The classify function determines that walking is indicated ("walk") when the output value of the CPD function is less than or equal to a threshold $\tau$ and that running is indicated ("run") when the output value of the CPD function is greater than the threshold $\tau$. For example, the classify function outputs "0" when the output value is less than or equal to the threshold $\tau$ and outputs "1" when the output value is greater than the threshold $\tau$. The state determination unit 25 outputs the output value of the CPD function and the output value of the classify function to the application unit 26. Instead of outputting the output value of the CPD function and the output value of the classify function directly to the application unit 26, the state determination unit 25 may store the output value of the CPD function and the output value of the classify function in a memory area that is referred to by the application unit 26.

The application unit 26 has the function of an application activated on the electronic device 10, and provides a service based on the application. In one preferred example, the application unit 26 converts the output value of the CPD function and the output value of the classify function, output from the state determination unit 25, into a specific motion or the like of the operable character, which is a function implemented in game apps in general. For example, the application unit 26 converts the output value of the CPD function, output from the state determination unit 25, directly into the movement speed of the operable character, and converts the output value of the classify function into the movement state (walking or running) of the operable character. In this embodiment, the function of the application unit 26 is realized by a native app installed in the electronic device 10.

Figure 4:
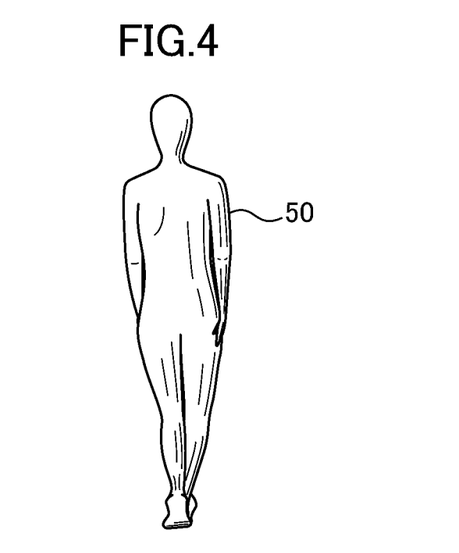
FIG. 4 is an illustration showing an example of a virtual character that is controlled by the electronic device.
Figure 5:
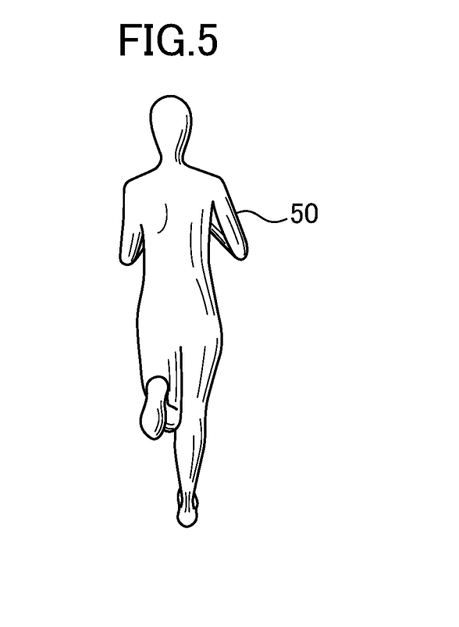
FIG. 5 is an illustration showing an example of a virtual character that is controlled by an electronic device.

FIGS. 4 and 5 are illustrations showing examples of an operable character 50 controlled by the electronic device 10. FIG. 4 shows a state in which the operable character 50 is walking, and FIG. 5 shows a state in which the operable character 50 is running. The electronic device 10 obtains the outputs of the CPD function and the classify function from the set of data points and controls the motion of the operable character 50, such as walking or running, on the basis of the outputs.

An example of the calculation of a speed factor by the engine unit 24 using the CPD function given in equation (3) will be described below. When n=5, the CPD function is expressed by equation (7).

$$CPD(x, y) = \quad (7)$$

-continued $$\sqrt{\frac{1}{5}\left\{(v_1-0)^2+(v_2-v_1)^2+\left(v_3-\frac{v_1+v_2}{2}\right)^2+\left(v_4-\frac{v_1+v_2+v_3}{3}\right)^2+\left(v_5-\frac{v_1+v_2+v_3+v_4}{4}\right)^2\right\}}$$

For example, in the case where the user swiftly moves a finger intentionally, the finger is accelerated for a certain period as a natural consequence. In this case, since the values $v_1$ to $v_5$ in equation (7) become large as a whole, the CPD function outputs a greater value. Meanwhile, in the case where the user does not swiftly move a finger intentionally, for example, one of the values $v_1$ to $v_5$ in equation (7) becomes large. In this case, the result of calculation based on the values $v_1$ to $v_5$ is multiplied by ⅕ (1/n) for the purpose of leveling, which prevents the CPD function from outputting an extremely large value. As described above, after the elapse of the period 5F (seconds) corresponding to five frames, the output value of the CPD function becomes a large value while the movement of a finger is continuously being accelerated intentionally and otherwise does not become a large value.

Figure 6:
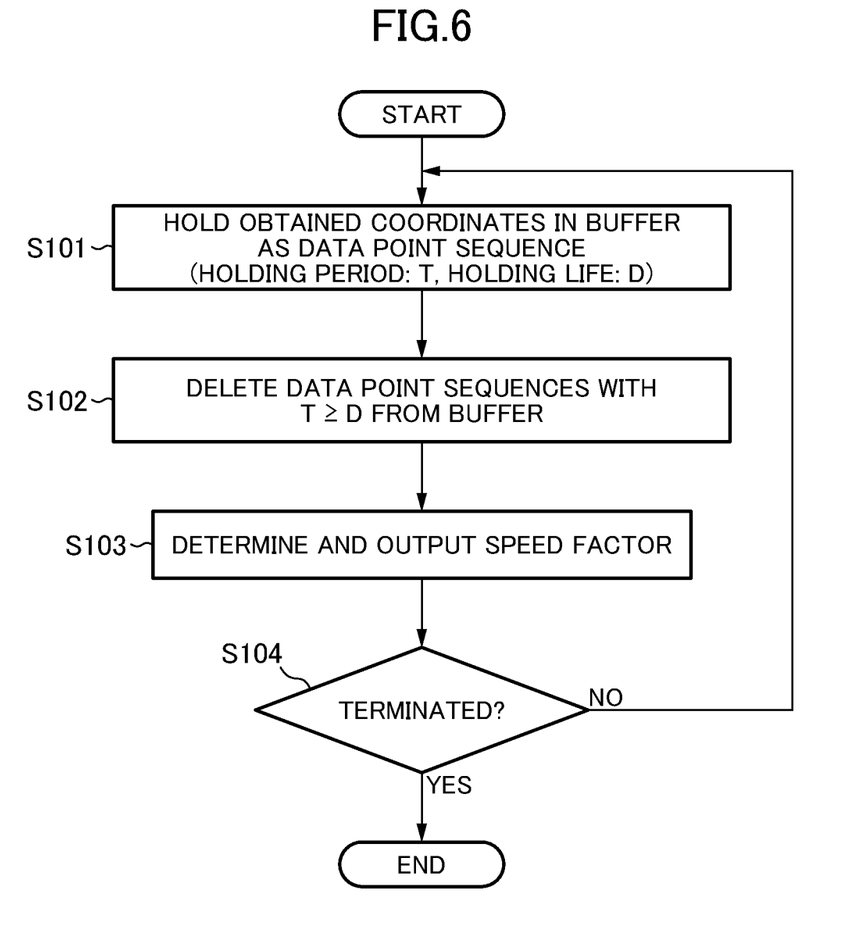
FIG. 6 is a flowchart of processing for determining a speed factor by the electronic device in the embodiment of the present invention.

FIG. 6 is a flowchart of a process according to the embodiment of the present invention, in which the electronic device 10 determines a speed factor. The electronic device 10 executes this process per frame period corresponding to the frame rate. It is assumed that the engine unit 24 obtains data points from touch events generated and stores the data points in the first buffer while this flowchart is being executed. However, the process in this flowchart need not be executed per frame period as long as the process is executed per certain period.

In step 101, the engine unit 24 holds coordinates (data points) obtained during one frame in the second buffer as a data point sequence P(i). At this time, the engine unit 24 associates, with the data point sequence P(i) that is held, T indicating the time elapsed after the storage thereof in milliseconds and a variable D indicating the allowable period of storage in the second buffer (holding life) in milliseconds.

Then, in step 102, the engine unit 24 terminates the holding of a data point sequence P(i) for which the time elapsed T is greater than or equal to the variable D among the data point sequences P(i) held in the second buffer.

Then, in step 103, a speed factor is determined by using equations (3) to (5). In step 104, the flowchart returns to step 101 unless the process is terminated, for example, due to the termination of the game application. When the flowchart comes to an end, the engine unit 24 deletes all the data point sequences held in the second buffer.

Next, main operations and advantages of the electronic device 10 according to the embodiment of the present invention will be described. This embodiment utilizes the characteristic of a projection-type electrostatic capacitive touchscreen, in which when the touchscreen 17 is swiped with a finger, six or more touch events are generated within an extremely short period, such as 100 ms. The system architecture of the software implemented by the electronic device 10 has a three-layer structure, in which the engine unit 24, the state determination unit 25, and the application unit 26 respectively correspond to the first layer, the second layer, and the third layer, where the third layer corresponds to, for example, the game application.

The first layer calculates the CPD function from a set of a plurality of touch events generated (a set of data points) by using equations (3) to (5) per predefined processing period, for example, per frame period, in the game application as the predefined processing period. The first layer outputs the output values of the CPD function as speed factors to the second layer. The second layer outputs the continuously output speed factors to the third layer, and outputs, by using the speed factors, a movement state indicating, for example, whether the operable character is walking or running to the third layer per predefined processing period. The movement state is output by using the classify function given in equation (6). The third layer converts the output value of the CPD function output from the second layer directly into a movement speed of the operable character, and converts the output value of the classify function into a movement state (walking or running) of the operable character.

As the first layer starts holding data point sequences in the second data buffer, the value of n indicating the number of frames for which data point sequences are stored increases as time elapses, like n=1, n=2 . . . . After the elapse of a period for which the first layer holds a data point sequence, n is fixed at the maximum value. The CPD function outputs a greater value when the displacement rate of each frame has a value greater than the average of the displacement rates up to the immediately preceding frame. Accordingly, in the case where the user swiftly moves a finger intentionally, since the finger is accelerated for a certain period as a natural consequence, the CPD function outputs a greater value. Meanwhile, in the case where the displacement rate becomes large only for one frame period due to the status of contact between the touchscreen 17 and a finger, the CPD function is multiplied by 1/n for the purpose of leveling, which prevents the CPD function from outputting an extremely large value, in particular, when the value of n is the maximum value. As described above, the output value of the CPD function takes on a large value in the case where the movement of a finger is continuously being accelerated intentionally and otherwise does not take on a large value, which makes it possible for the electronic device 10 to determine the movement state of the operable character 50 in accordance with an intuitive user operation. Furthermore, since the CPD function absorbs the habits and personal differences in the speed of moving a finger among individual users by using deviations, it becomes possible for the electronic device 10 to detect only intentional acceleration by using the CPD function.

Furthermore, as the first layer starts holding data point sequences in the second data buffer, n takes on relatively small values among possible values, like n=1, n=2, . . . , and thus the influence of multiplication by 1/n is small. Thus, by using the CPD function, it becomes possible for the electronic device 10 to determine the movement state of the operable character 50 immediately from the first frame after a user input. For example, if the user moves a finger speedily, the electronic device 10 can immediately render the operable character 50 in a running state. Meanwhile, with an operation in which the user gradually accelerates the movement of a finger, since the electronic device 10 determines the movement state every frame by using the CPD function, which integrates weights in accordance with the duration of acceleration, the electronic device 10 can change the state of the operable character 50 from a walking state to a running state. Furthermore, since the accuracy of recognition with the determination based on the CPD function improves with the number of frames elapsed, even in the case where it is not possible to distinguish between walking and running in the first frame, distinction becomes possible in the second frame or the third frame.

Furthermore, in this embodiment, since the first layer is configured to continuously calculate a speed factor on a per frame rate basis by using touch events generated during an extremely short period, it becomes possible for each of the layers to calculate the movement speed of the operable character without having to use past touched coordinates as a reference point. As described above, in this embodiment, the electronic device 10 calculates a speed without using the spatial concept of points, such as start points (start coordinates) and end points (end coordinates), which has been used in virtual controllers in the existing technology.

Furthermore, in this embodiment, as opposed to the virtual controller in the existing technology, i.e., the virtual controller that uses a vector obtained on the basis of the positional relationship between reference coordinates and current instruction coordinates, the concept of reference coordinates is not involved, which makes it possible to provide higher responsiveness compared with the virtual controller with which reference coordinates are defined. In particular, in the case of an operation for switching the direction of the operable character, even if the user performs an operation on the touchscreen 17 in a direction considerably different from the direction before switching, since the concept that the current instruction coordinates approach the reference coordinates is lacking, it is possible to quickly respond to the intent of the operation by the user so as to reflect the operation on the motion of the operable character. Furthermore, with the configuration described above, a user operating a smartphone is allowed to perform operations with one hand. This makes it possible to solve the problem that it is necessary for a user to be constantly aware of reference coordinates when performing operations with the virtual joystick in the existing technology and thus there are cases where it is difficult to perform operations with one hand. As described above, in this embodiment, a virtual controller that enables quicker and more intuitive operation is realized.

Furthermore, in this embodiment, as opposed to the virtual controller in the existing technology, since input is not based on the movement distance of a finger from reference coordinates, it becomes possible to realize operations intended by the user via operations with smaller amounts of movement of a finger. Thus, as compared with the existing technology, implementation with a smaller implementation area becomes possible. For example, it becomes possible to realize the same operability irrespective of the size of the touchscreen 17.

Furthermore, in the virtual controller technology provided by the electronic device 10 according to this embodiment, motion control of a character is mathematically modeled on motion control based on the movement speed of a finger and the duration of acceleration associated with a swipe operation, which is a novel viewpoint. This enables application of the technology to a wide variety of game genres. Furthermore, since all the operations are numerically controlled on the basis of the mathematical model, it is possible to produce various kinds of motion control by changing setting values, such as the value of β in equation (4).

The operations and advantages described above also apply similarly to other embodiments and other examples unless otherwise specifically mentioned.

Another embodiment of the present invention may be a program for realizing the functions or the information processing shown in the flowchart in the above-described embodiment of the present invention, or a computer-readable storage medium storing the program. Furthermore, another embodiment of the present invention may be a method for realizing the functions or the information processing shown in the flowchart in the above-described embodiment of the present invention. Furthermore, another embodiment of the present invention may be a server that is capable of providing a computer with a program for realizing the functions or the information processing shown in the flowchart in the above-described embodiment of the present invention. Furthermore, another embodiment of the present invention may be a virtual machine for realizing the functions or the information processing shown in the flowchart in the above-described embodiment of the present invention.

Now, modifications of the embodiments of the present invention will be described. The modifications described below can be combined as appropriate and applied to any embodiment of the present invention as long as no inconsistency arises.

In one modification, the movement state determined by the state determination unit 25 is one of a state in which the operable character is walking, a state in which the operable character is walking fast, and a state in which the operable character is running. In this case, the classify function is calculated according to equation (8).

$$\text{classify}(x, y) = \begin{cases} \text{"walk 1"}, & CPD(x, y) \le t1 \\ \text{"walk2"}, & t1 \le CPD(x, y) \le t2 \\ \text{"run"}, & CPD(x, y) > t2 \end{cases} \quad (8)$$

The classify function is a function that determines that walking is indicated ("walk1") when the output value of the CPD function is less than or equal to a threshold t1, fast walking is indicated ("walk2") when the output value of the CPD function is greater than the threshold t1 and less than or equal to a threshold t2, and running is indicated ("run") when the output value of the CPD function is greater than the threshold t2. For example, the classify function outputs "0" when the output value is less than or equal to the threshold t1, outputs "1" when the output value is greater than the threshold t1 and less than or equal to the threshold t2, and outputs "2" when the output value is greater than the threshold t2. The state determination unit 25 outputs the output value of the CPD function and the output value of the classify function to the application unit 26. Instead of outputting the output value of the CPD function and the output value of the classify function directly to the application unit 26, the state determination unit 25 may store the output value of the CPD function and the output value of the classify function in a memory area that is referred to by the application unit 26. As described above, the movement states may be a plurality of states including a state in which the operable character is walking and a state in which the operable character is running. It suffices for the classify function to be a function for determining one of the movement states in accordance with set thresholds.

In one modification, the engine unit 24 determines a movement state and outputs the movement state to the application unit 26 on behalf of the state determination unit 25.

In one modification, the engine unit 24 holds displacement rates $v_i$ that have been determined in a third buffer in the storage device 14 for the purpose of reference at the time of calculating the CPD function. In the case where the number of displacement rates held in the third buffer exceeds a predefined number, the engine unit 24 terminates the holding of the displacement rate that was held first among the held displacement rates. For example, when terminating the holding of the data of a displacement rate, the engine unit 24 may delete the data, invalidate the data, or delete the data, as appropriate, by associating a flag indicating that the holding has been terminated with the data. For example, the engine unit 24 holds displacement rates $v_i$ corresponding to five frames at most. The engine unit 24 holds five displacement rates in order of $v_5$, $v_4$, $v_3$, $v_2$, and $v_1$ from the latest to the earliest. Accordingly, in the case where the engine unit 24 holds displacement rates corresponding to five frames, $v_5$ is the latest data point sequence that has been held. In the case where a displacement rate is to be newly held, the engine unit 24 holds the new displacement rate as $v_5$, substitutes the data of vin for $v_i$ ($1 \leq i \leq 4$), and terminates the holding of $v_1$.

In one modification, the function of the application unit 26 is realized by a Web app installed in the electronic device 10. In this case, a server that communicates with the electronic device 10 sends a portion or the entirety of the application unit 26 in the form of a Web page to the electronic device 10, while the Web app executes the processing to be executed by the application unit 26 on the electronic device 10, and sends data to and receives data from the server.

In one modification, the input device 12 and the display device 13 have separate forms disposed at different positions. In this case, the input device 12 is a touchscreen or a device having a function equivalent to the function of a projection-type electrostatic capacitive touchscreen. It suffices for the display device 13 to be a device that displays an application screen, etc. to the user of the electronic device 10 under the control of the processor 11. For example, the display device 13 is a liquid crystal display, a display using organic EL, or a plasma display.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

10 Electronic device
11 Processor
12 Input device
13 Display device
14 Storage device
15 Communication device
16 Bus
17 Touchscreen
21 Input unit
22 Display unit
23 Control unit
24 Engine unit
25 State determination unit
26 Application unit
50 Operable character

The invention claimed is:

1. A non-transitory computer readable medium storing a program that is executed on an electronic device, the program causing the electronic device to execute a method comprising:
    a step of executing a computer game using a game application, wherein executing the computer game comprises providing a virtual controller for controlling a virtual operable object in the computer game, the virtual operable object being a game character that is in a virtual space;
    a step of holding a plurality of data points as a plurality of held data point sequences in response to executing the computer game,
        wherein a respective held data point sequence among the plurality of held data point sequences corresponds to a respective frame period based on a frame rate for executing the computer game, and
        wherein the plurality of data points are obtained based on a plurality of touch events generated as a result of an operation performed on a touchscreen by a user and indicated by a first plurality of values on a first axis and a second plurality of values on a second axis;
    a step of determining a first plurality of displacement rates of the plurality of data points in the plurality of held data point sequences based on one or more displacements of the plurality of data points,
    wherein a displacement rate among the first plurality of displacement rates corresponds to a movement speed of a finger of the user during a frame period of the computer game;
    a step of determining a speed factor based on a deviation of a displacement rate in a frame among the plurality of held data point sequences relative to a first average of the first plurality of displacement rates for a plurality of frames held earlier than the frame; and
    a step of controlling a movement state of the virtual operable object in the virtual space based on the speed factor and using the virtual controller,
    wherein the virtual controller changes the movement state of the virtual operable object in response to the operation being performed on the touchscreen by the user, and
    wherein the step of determining the speed factor comprises determining the speed factor based on a deviation of a displacement rate in one data point sequence among the plurality of held data point sequences relative to a second average of a second plurality of displacement rates in a plurality of data point sequences held earlier than the one data point sequence.

2. The non-transitory computer readable medium according to claim 1,
    wherein the step of holding the plurality of data points comprises terminating a holding of a data point sequence for which a predefined holding period has expired among the plurality of held data point sequences.

3. The non-transitory computer readable medium according to claim 1,
    wherein the step of holding the plurality of data points as the plurality of held data point sequences comprises holding individually the first plurality of values on the first axis as a first sequence for the first axis and the second plurality of values on the second axis as a sequence a second sequence for the second axis, and
    wherein the step of determining the speed factor comprises determining a displacement of the first plurality of values of the first sequence for the first axis and a displacement of the second plurality of values of the second sequence for the second axis.

4. The non-transitory computer readable medium according to claim 1, wherein the step of determining the speed factor comprises determining the displacement rate in a held data point sequence among the plurality of held data point sequences based on an amount of displacement of data points adjacent to each other sequentially in time in the held data point sequence as well as a number of data points that are included in the held data point sequence.

5. The non-transitory computer readable medium according to claim 1, wherein the first axis is parallel to a longer side of the touchscreen and the second axis is parallel to a shorter side of the touchscreen.

6. The non-transitory computer readable medium according to claim 1,
wherein the movement state includes a first state in which the game character is walking and a second state in which the game character is running.

7. An electronic device, comprising
a touchscreen;
a memory; and
a processor connected to the touchscreen and the memory, wherein the memory comprises instructions when executed by the processor are configured to perform a method comprising:
  executing a computer game using a game application, wherein executing the computer game comprises providing a virtual controller for controlling a virtual operable object in the computer game, the virtual operable object being a game character that is in a virtual space;
  holding a plurality of data points as a plurality of held data point sequences in response to executing the computer game,
    wherein a respective held data point sequence among the plurality of held data point sequences corresponds to a respective frame period based on a frame rate for executing the computer game, and
    wherein the plurality of data points are obtained based on a plurality of touch events generated as a result of an operation performed on the touchscreen by a user and indicated by a first plurality of values on a first axis and a second plurality of values on a second axis,
  determining a plurality of displacement rates of the plurality of data points in the plurality of held data point sequences based on one or more displacements of the plurality of data points,
    wherein a displacement rate among the plurality of displacement rates corresponds to a movement speed of a finger of the user during a frame period of the computer game,
  determining a speed factor based on a deviation of a displacement rate in a frame among the plurality of held data point sequences relative to an average of the plurality of displacement rates for a plurality of frames held earlier than the frame; and
  controlling a movement state of the virtual operable object in the virtual space based on the speed factor and using the virtual controller,
wherein the virtual controller changes the movement state of the virtual operable object in response to the operation being performed on the touchscreen by the user,
wherein determining the speed factor comprises determining the speed factor based on a deviation of a displacement rate in one data point sequence among the plurality of held data point sequences relative to a second average of a second plurality of displacement rates in a plurality of data point sequences held earlier than the one data point sequence.

8. A method, comprising:
a step of executing a computer game using a game application, wherein executing the computer game comprises providing a virtual controller for controlling a virtual operable object in the computer game, the virtual operable object being a game character that is in a virtual space;
a step of holding a plurality of data points as a plurality of held data point sequences in response to executing the computer game,
wherein a respective held data point sequence among the plurality of held data point sequences corresponds to a respective frame period based on a frame rate for executing the computer game, and
wherein the plurality of data points are obtained based on a plurality of touch events generated as a result of an operation performed on a touchscreen by a user and indicated by a first plurality of values on a first axis and a second plurality of values on a second axis;
a step of determining a plurality of displacement rates of the plurality of data points in the plurality of held data point sequences based on one or more displacements of the plurality of data points,
wherein a displacement rate among the plurality of displacement rates corresponds to a movement speed of a finger of the user during a frame period of the computer game;
a step of determining a speed factor based on a deviation of a displacement rate in a frame among the plurality of held data point sequences relative to an average of the plurality of displacement rates for a plurality of frames held earlier than the frame; and
a step of controlling a movement state of the virtual operable object in the virtual space based on the speed factor and using the virtual controller,
wherein the virtual controller changes the movement state of the virtual operable object in response to the operation being performed on the touchscreen by the user,
wherein the step of determining the speed factor comprises determining the speed factor based on a deviation of a displacement rate in one data point sequence among the plurality of held data point sequences relative to a second average of a second plurality of displacement rates in a plurality of data point sequences held earlier than the one data point sequence.

* * * * *